(12) United States Patent
Boggs et al.

(10) Patent No.: US 12,401,204 B2
(45) Date of Patent: Aug. 26, 2025

(54) CIRCUIT TO DRIVE ELECTRICALLY CONTROLLED SWITCHES WITHIN ELECTRIFIED MACHINE

(71) Applicant: Caterpillar Inc., Peoria, IL (US)

(72) Inventors: Matthew Lee Boggs, Metamora, IL (US); Jason Lee Miller, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 670 days.

(21) Appl. No.: 17/855,968

(22) Filed: Jul. 1, 2022

(65) Prior Publication Data

US 2024/0006893 A1    Jan. 4, 2024

(51) Int. Cl.
*H02J 7/00*    (2006.01)
*B60R 16/033*    (2006.01)

(52) U.S. Cl.
CPC .......... *H02J 7/0013* (2013.01); *B60R 16/033* (2013.01); *H02J 7/00304* (2020.01); *H02J 7/0047* (2013.01)

(58) Field of Classification Search
CPC .................................................. H02J 7/0013
USPC ....................................................... 320/128
See application file for complete search history.

(56) References Cited

U.S. PATENT DOCUMENTS

| | | | |
|---|---|---|---|
| 7,605,568 B2 | 10/2009 | Gangstoe et al. | |
| 9,583,745 B2 | 2/2017 | White et al. | |
| 10,155,449 B2 | 12/2018 | Chen et al. | |
| 2013/0207464 A1* | 8/2013 | Kluthe | H01M 10/613 307/10.7 |
| 2015/0340743 A1* | 11/2015 | Fink | G01R 31/396 429/61 |
| 2016/0141894 A1 | 5/2016 | Beaston | |
| 2017/0166075 A1 | 6/2017 | Hong et al. | |
| 2018/0233928 A1* | 8/2018 | Li | H02J 7/0029 |
| 2019/0103750 A1 | 4/2019 | Kristensen | |
| 2020/0412155 A1* | 12/2020 | Choi | H02J 7/007182 |
| 2021/0141043 A1 | 5/2021 | Bertness | |

FOREIGN PATENT DOCUMENTS

| | | |
|---|---|---|
| CN | 105490255 | 10/2017 |
| CN | 209462020 | 10/2019 |
| CN | 209766327 | 12/2019 |
| CN | 112216558 | 1/2021 |
| CN | 112216558 A | 1/2021 |

OTHER PUBLICATIONS

Written Opinion and International Search Report for Int'l. Patent Appln. No. PCT/US2023/068658, mailed Oct. 10, 2023 (36 pgs).

* cited by examiner

*Primary Examiner* — Yalkew Fantu (57) ABSTRACT

A driving circuit to control/drive a contactor using a high-side driver integrated into the battery pack controller. The driver circuit may electrically isolate the controller pins of the battery pack controller (which interface the contactors) from the low-voltage digital processing core of the battery pack controller. The driver circuit may provide techniques to diagnose a fault by monitoring the voltage at the output of the driver as compared to the reference voltage. The driver circuit may include an electronic switch, such as a field-effect transistor, that is configured on the high side of the contactor to control voltage from an energy source to the contactor.

20 Claims, 5 Drawing Sheets

CIRCUIT TO DRIVE ELECTRICALLY CONTROLLED SWITCHES WITHIN ELECTRIFIED MACHINE

TECHNICAL FIELD

This document relates generally to a battery management system for an electrified machine and, in particular, to techniques for operating electrically controlled switches.

BACKGROUND

Battery Management Systems IBMS) for electrified machines may operate electrically-controlled high-current and high-voltage switches called contactors for the purpose of connecting/disconnecting strings of lithium-ion batteries and for controlling the charging/discharging of the batteries within a battery pack on a mobile machine or stationary power application.

CN112216558A describes a relay driving circuit and an electrical system, the relay driving circuit comprises a power supply module, a control module, a high-side driving module and a low-side driving module. The high-side driving module and the low-side driving module are connected in series and are respectively controlled by the control module, so that a high-side and low-side series driving mode of the relay is realized. The problem of misoperation of the relay when the output end of the existing single-side relay driving circuit driven by a single high-side switch or a single low-side switch is short-circuited or open-circuited can be avoided.

SUMMARY OF THE INVENTION

This disclosure describes a driving circuit to control/drive a contactor using a high-side driver integrated into the battery pack controller. The driver circuit may electrically isolate the controller pins of the battery pack controller (which interface the contactors) from the low-voltage digital processing core of the battery pack controller. The driver circuit may provide techniques to diagnose a fault by monitoring the voltage at the output of the driver as compared to the reference voltage. The driver circuit may include an electronic switch, such as a field-effect transistor, that is configured on the high side of the contactor to control voltage from an energy source to the contactor.

In some aspects, this disclosure is directed to a battery management system configured to couple to a plurality of battery modules, wherein corresponding ones of the plurality of battery modules include a battery cell and a cell monitoring circuit, the battery management system comprising: a plurality of electrically controlled switches electrically coupled to the plurality of battery modules; a switch control circuit configured to operate the plurality of electrically controlled switches; driver circuitry electrically coupled to the switch control circuit and configured to drive the switch control circuit, the driver circuitry electrically coupled to a first voltage source; and processing circuitry electrically coupled to a second voltage source that is different from the first voltage source, Wherein the processing circuitry is configured to receive battery information from corresponding cell monitoring circuits of the plurality of battery modules, wherein the processing circuitry is electrically isolated from the driver circuitry, and wherein the processing circuitry is in communication with the driver circuitry via at least one data channel.

In some aspects, this disclosure is directed to a method of operating a battery management system having a plurality of battery modules, wherein corresponding ones of the plurality of battery modules include a battery cell and a cell monitoring circuit, the method comprising: coupling driver circuitry to a first voltage, wherein the driver circuitry is electrically coupled to and configured to drive a switch control circuit, and wherein a switch control unit is configured to operate a plurality of switches electrically coupled to the plurality of battery modules; coupling processing circuitry to a second voltage that is different from the first voltage; electrically isolating the processing circuitry from the driver circuitry, wherein the processing circuitry is in communication with the driver circuitry via at least one data channel; and generating, using the processing circuitry, a first driver control signal to enable an electronic switch of the driver circuitry via the at least one data channel.

In some aspects, this disclosure is directed to a electrified machine comprising: a machine frame; and a battery management system supported by the machine frame and configured to couple to a plurality of battery modules, wherein corresponding ones of the plurality of battery modules include a battery cell and a cell monitoring circuit, the battery management system comprising: a plurality of electrically controlled switches electrically coupled to the plurality of battery modules; a switch control circuit configured to operate the plurality of electrically controlled switches; driver circuitry electrically coupled to the switch control circuit and configured to drive the switch control circuit, the driver circuitry electrically coupled to a first voltage source; and processing circuitry electrically coupled to a second voltage source that is different from the first voltage source, wherein the processing circuitry is configured to receive battery information from corresponding cell monitoring circuits of the plurality of battery modules, wherein the processing circuitry is electrically isolated from the driver circuitry, and wherein the processing circuitry is in communication with the driver circuitry via at least one data channel.

DETAILED DESCRIPTION

Examples according to this disclosure are directed to techniques for driving electrically controlled switches within an electrified machine.

Electrified machines are powered by batteries instead of an engine. A battery pack may include one or more battery modules, and a battery module may include one or more battery cells. Battery modules may include a battery cell monitoring circuit to monitor, among other things, a voltage and a temperature of the battery cells in the battery module.

A battery pack controller may be in communication with the various battery module monitoring circuits to receive and aggregate the information from the various battery modules. The battery pack controller may coordinate operation of all the battery modules. The battery modules may be connected, such as in series and in parallel, with one another using high voltage, high current electrically controlled contacts of a contactor.

Some battery management approaches drive, or control, these contactors using pilot/interposed relays, which are external to both the contactor and the battery pack controller or with low-side, sinking driver circuits within the battery pack controller. The present inventors have recognized that these approaches may have various drawbacks, such as increased component count, increased cost, and/or low reliability. In addition, these approaches may also cause incompatibility with the operation of some contactor devices. The present inventors have recognized a need for a solution that drives/controls the contactors using a high-side driver, not a low-side driver, that is integrated into the battery pack controller and that does not require external pilot/interpose relays.

This disclosure describes a driving circuit to control/drive a contactor using a high-side driver integrated into the battery pack controller. The driver circuit may electrically isolate the controller pins of the battery pack controller (which interface the contactors) from the low-voltage digital processing core of the battery pack controller. The driver circuit may provide techniques to diagnose a fault by monitoring the voltage at the output of the driver as compared to the reference voltage. The driver circuit may include an electronic switch, such as a field-effect transistor, that is configured on the high side of the contactor to control voltage from an energy source to the contactor.

Figure 1:
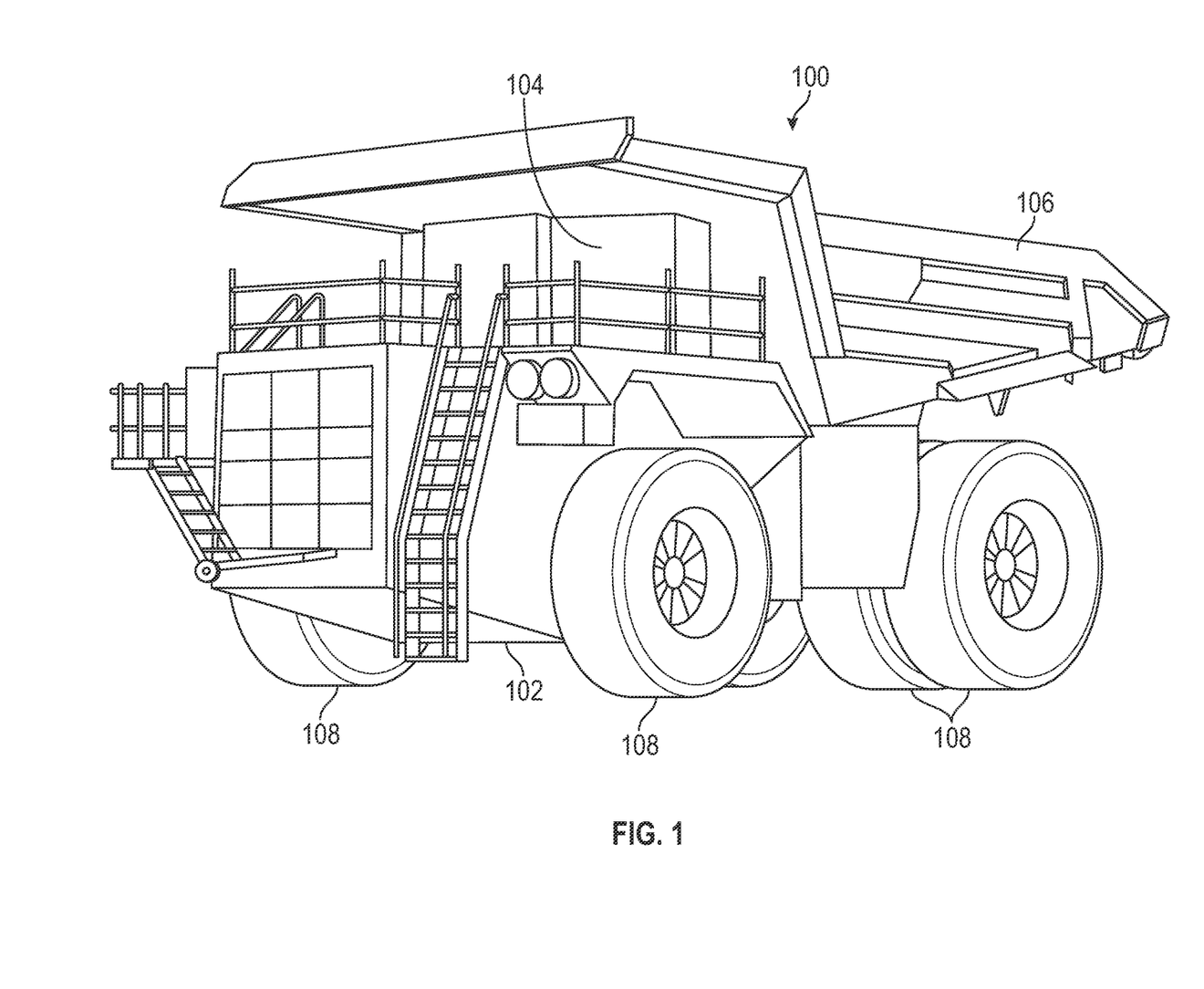
FIG. 1 is a perspective view of an example of an electrified machine that may implement various techniques of this disclosure.

The driver circuit may include a current sensing circuit between the electronic switch and the energy source to monitor the current through the electronic switch and provide a sensing current output to a protection circuit. The protection circuit may turn the electronic switch off when the sensing current exceeds either a high-current threshold or a low-current threshold for a specific period of time. Further, in the event of a fast turn-off of the driver circuit after receiving the off command, the driver circuit design may provide sufficient development of back EMF for the contactor, FIG. 1 is a perspective view of an example of an electrified machine that may implement various techniques of this disclosure. A non-limiting example of an electrified machine 100 is shown in FIG. 1. The electrified machine 100 may be any machine or vehicle powered, at least partially, by batteries, as will be described below with reference to FIG. 2. The electrified machine 100 may be a mining truck, as depicted, or any other on-highway or off-highway machine or vehicle. In some examples, the electrified machine 100 may include a machine frame 102 supporting at least an operator control station 104 and a dump body 106. Ground-engaging elements 108, such as wheels and/or endless-link treads, may also be supported by the machine frame 102, and may be powered by a drive system, discussed below, supported by the machine frame 102.

Figure 2:
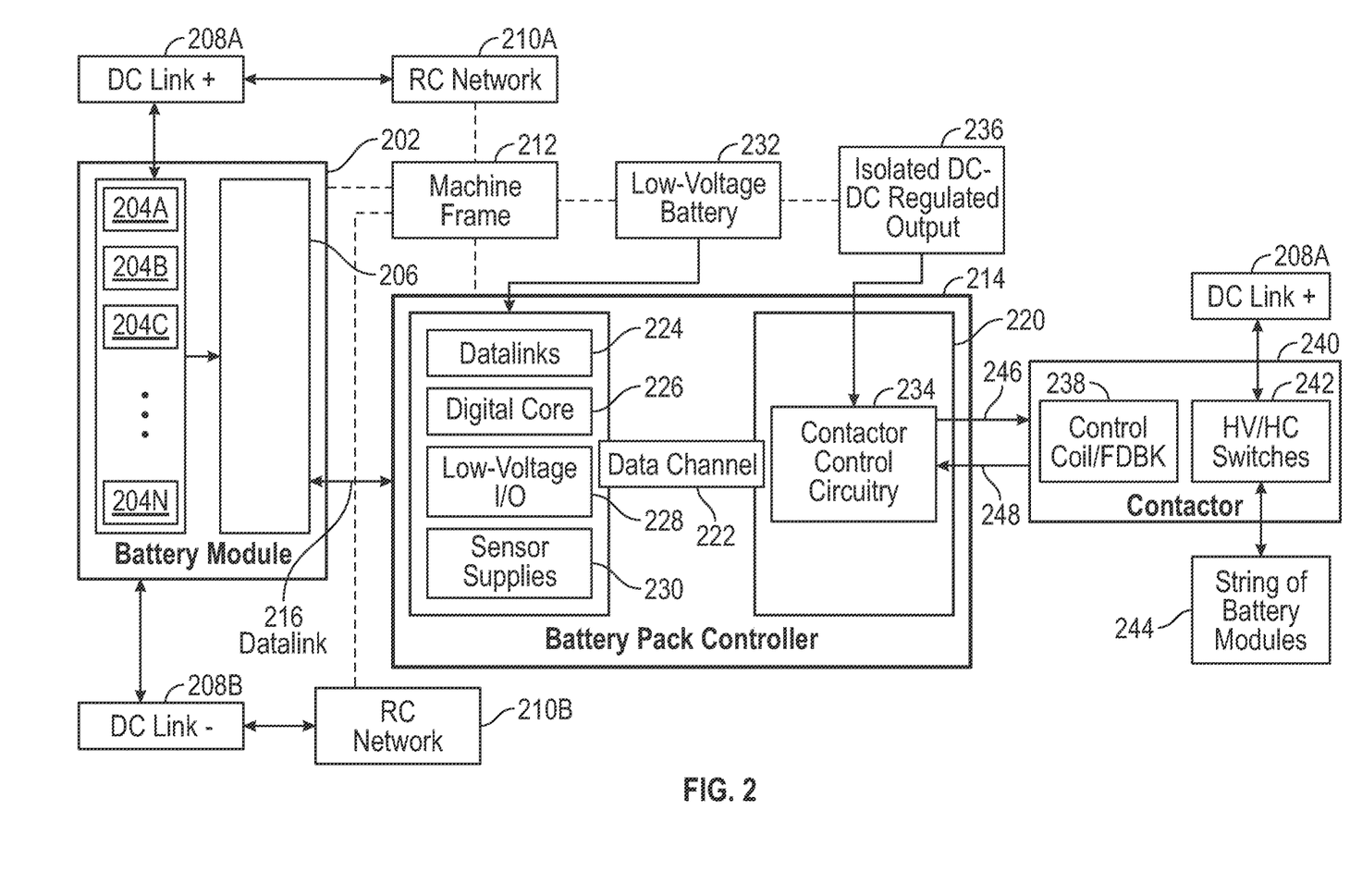
FIG. 2 is an example of a battery system that may implement various techniques of this disclosure.

FIG. 2 is an example of a battery system that may implement various techniques of this disclosure. The battery management system 200 may include a battery module 202 that includes a plurality of battery cells 204A-204N (collectively referred to in this disclosure as "battery cells 204").

The battery cells 204 may interface with a cell monitoring circuit 206 that may monitor various battery parameters, such as voltage and temperature of the battery cells. The cell monitoring circuit 206 may manage the health of the battery cells 204, including charging and discharging of the battery cells 204. The battery module 202 may be coupled in series, fir example, with other battery modules 202 to create a "DC Link", such as 700 volts (V) or greater, which is represented by DC Link+ 208A and DC Link-208B.

The DC Link+ 208A may be coupled via an RC network 210A to a machine frame 212, such as the machine frame 102 of FIG. 1, by a DC bonding mutual point. For example, the RC network 210A may AC couple the floating differential DC Link to a pseudo ground reference. The DC Link-208B may be coupled via a similar RC network 2108 to the machine frame 212.

The battery management system 200 may include a battery pack controller 214 to aggregate and control the activity of the various battery modules 202 on the electrified machine, such as the electrified machine 100 of FIG. 1, which may include a hundred or more battery cells 204. The battery pack controller 214 may communicate with the various cell monitoring circuits 206 via datalink 216 (for brevity, only one such monitoring circuit 206 has been shown).

The battery pack controller 214 may include processing circuitry 218 and driver circuitry 220, such as in the same controller housing. The processing circuitry 218 may be electrically isolated from the driver circuitry 220 and in communication with the driver circuitry 220 via one or more data channels 222. Isolating the processing circuitry 218 from the driver circuitry 220 such that the only communication between them is by data channel 222 protects the processing circuitry 218 from excessively high voltage.

In some examples, the processing circuitry 218 may include one or more datalinks 224, e.g., Control Area Network (CAN) datalink, a digital processing core 226, low voltage input/output (I/O) 228, and one or more sensor supplies 230 to provide power to various sensors external to the battery pack controller 214. The processing circuitry 218 may be coupled to a first voltage source, such as from a first voltage source 232, e.g., a 9-32V lead acid battery system.

The driver circuitry 220 may be coupled to a second voltage source, such as a second voltage source 236, where the second voltage source is different from the first voltage source. Such a design allows the driver circuitry 220 to be powered by an independent, regulated voltage supply on the electrified machine, e.g., the electrified machine 100 of FIG. 1.

The driver circuitry 220 may include contactor control circuitry 234 and be electrically coupled to a switch control circuit 238 of a contactor 240. A contactor is similar to a relay, with a coil and switches, e.g., contacts, that operate when the coil is energized or deenergized.

The switch control circuit 238 includes a control coil and feedback circuit and is configured to operate a plurality of switches 242, e.g., high current, high voltage contacts, that are electrically coupled to a string of battery modules 244. The string of battery modules 244 includes a plurality of battery modules 202 coupled in series with one another. In some examples, a first contact of the contactor may be coupled near the top of the string of battery modules 244 and a second contact of the contactor may be coupled near the bottom of the string of battery modules 244. This allows switching of particular strings of battery modules in and out of the DC Link, selectively isolating a string if there is a fault, and/or selectively charging strings.

The battery pack controller 214 outputs a control signal 246 that controls operation of the plurality of switches 242, e.g., contacts, coupled to the battery modules 244 by driving a control coil of the switch control circuit 238 of the contactor 240 using the control signal 246. The contactor 240 provides a feedback signal 248 to the battery pack controller 214 to communicate what the contactor 240 believes to be the state (pen or closed) of the switches 242, e.g., contacts. The feedback signal 248 may be an analog signal or a digital signal.

The battery management system 200 may be implemented in an electrified machine, such as the electrified machine 100 of FIG. 1.

Figure 3:
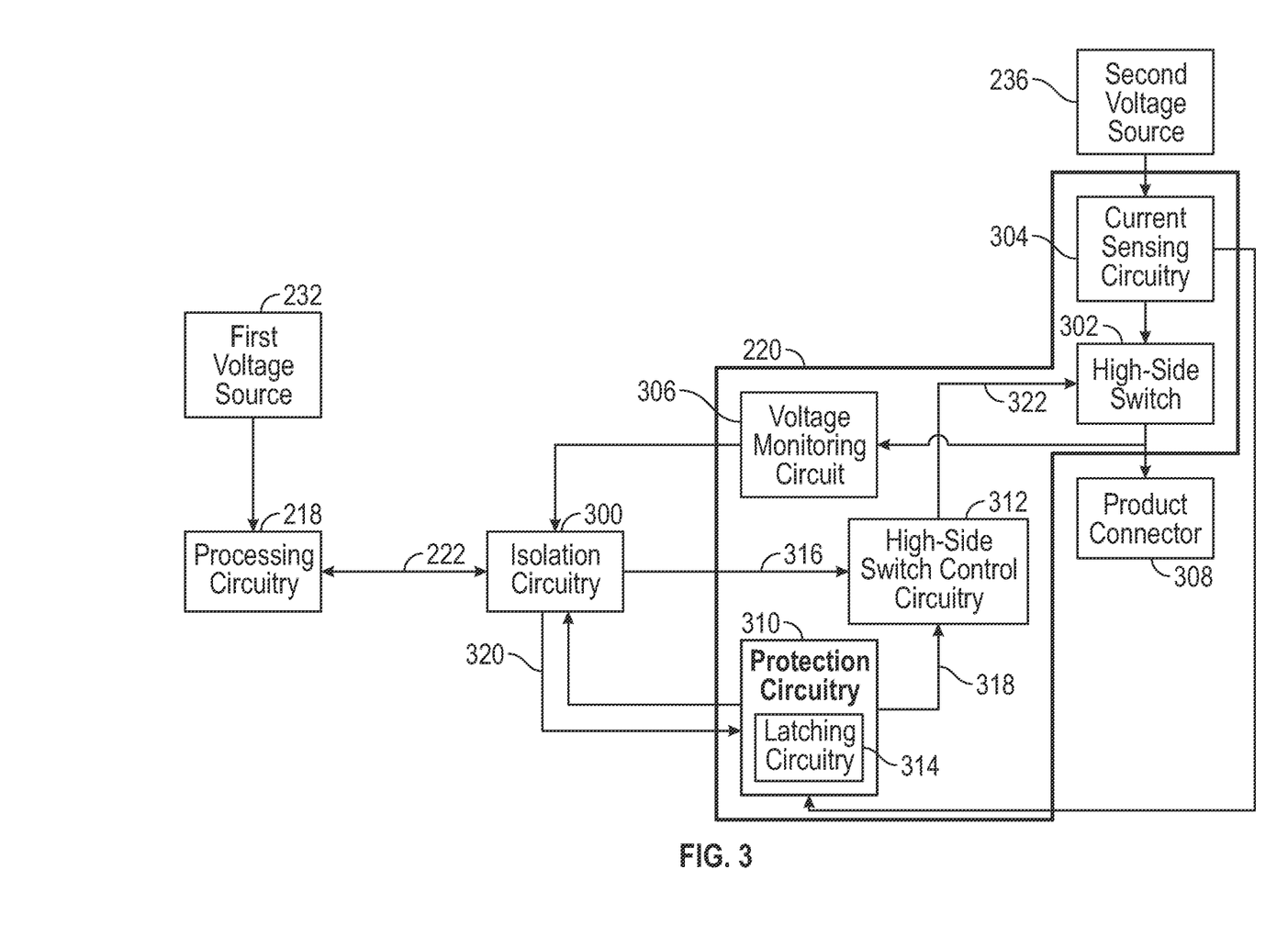
FIG. 3 is a block diagram of an example of the driver circuitry of FIG. 2 that may implement various techniques of this disclosure.

FIG. 3 is a block diagram of an example of the driver circuitry 220 of FIG. 2 that may implement various techniques of this disclosure. Like in FIG. 2, the processing circuitry 218 is coupled to the first voltage source 232 and the driver circuitry 220 is coupled to the second voltage source 236. The processing circuitry 218 is electrically isolated from the driver circuitry 220 using isolation circuitry 300, e.g., a digital isolator circuit. The processing circuitry 218 and the driver circuitry 220 may communicate over the isolation barrier over one or more data channels 222.

The driver circuitry 220 may include a high side electronic switch 302, such as a semiconductor switch, e.g., field-effect transistor (FET), positioned between the second voltage source 236 and the control coil input of the contactor. The control coil input of the external contactor is connected to a product connector via a wiring harness. The electronic switch 302 controls the application of voltage to the contactor from the second voltage source 236. In some examples, the electronic switch 302 is a p-type FET.

In some examples, the electronic switch 302 has an avalanche rating that allows the contactor control coil to develop the back EMF needed for fast turn-off when the processing circuitry 218 commands the driver circuitry 220 to turn off. Back EMF is needed for the contactor to quickly open its contact. If the avalanche rating of the electronic switch 302 is insufficient, the contactor may be unable to quickly open its contact and break the high voltage, high current connection, which may result in arcing and possibly welding the contacts together.

The driver circuitry 220 may include current sensing circuitry 304 to monitor a current through the electronic switch 302. In particular, the current sensing circuitry 304 is configured to sense a representation of the current through the electronic switch 302, such as a voltage generated across a sense resistor.

The driver circuitry 220 in FIG. 3 may include a voltage monitoring circuit 306 configured to monitor a voltage at an output of the driver circuitry 220, such as at the product connector 308, and communicate a representation of the voltage to the processing circuitry 218 across the isolation barrier via data channel(s) 222. For example, the voltage monitoring circuit 306 may allow a comparison of a representation of a voltage on the pins of an interface to the control coils of the contactor.

In some examples, the voltage monitoring circuit 306 includes a comparator circuit coupled to a fixed reference voltage, such as generated by a voltage divider circuit. The voltage monitoring circuit 306 compares an output of the driver circuitry 220 to the fixed reference voltage and provides a corresponding signal to the processing circuitry 218 indicating whether voltage is above or below the fixed threshold voltage. In such an implementation, the voltage monitoring circuit 306 may communicate a state and not the voltage itself.

The driver circuitry 220 may include protection circuitry 310. The protection circuitry 310 outputs a control signal to turn OFF, e.g., disable, the electronic switch 302 if the sensed current through the electronic switch 302 either: a) exceeds a high-current threshold or b) exceeds a lower-current threshold for a specific duration of time. In other words, the protection circuitry 310 may disable the electronic switch 302 when a level of current exceeds a first threshold or disable the electronic switch 302 when the level of current exceeds a second threshold for a duration of time, where the first threshold is higher than the second threshold. If either of these protection criteria have been met, the protection circuitry 310 outputs another control signal to deactivate high-side switch control circuitry 312, which overrides a first driver control signal 316 from the contactor control circuitry 234 of FIG. 2, and latches the electronic switch 302 in an OFF state using latching circuitry 314.

In some examples, during normal operation, the processing circuitry 218 outputs a first driver control signal 316 to enable the electronic switch 302 via control signal 322. The first driver control signal 316 turns ON a first n-type FET of the high-side switch control circuitry 312 that pulls down a gate terminal of the electronic switch 302, e.g., a p-type FET, using control signal 322 to keep the electronic switch 302 turned ON. But, if the protection circuitry 310 detects a fault, the protection circuitry 310 applies a signal to a gate terminal of a second n-type FET of the latching circuitry 314. When ON, the second n-type FET of the latching circuitry pulls down the gate terminal of the first n-type FET using a control signal 318, which, in turn prevents the processing circuitry 218 from turning ON the first n-type FET, thereby preventing the electronic switch 302 from turning ON. In this manner, the latching circuitry 314 latches the electronic switch 302 in an OFF state when the level of the current exceeds a threshold.

In some examples, the latching circuitry 314 includes a latch RC circuit timer. When the processing circuitry 218 outputs a second driver control signal 320 to turn OFF the driver circuitry 220, the latch RC circuit timer begins to discharge until the latching circuitry 314 is reset. In this manner, the second driver control signal 320 disables the electronic switch 302 of the driver circuitry and resets the latching circuitry 314.

In some examples, two signals may be sent across the isolation barrier via the one or more data channels 222 to the processing circuitry 218: 1) an ON/OFF signal that controls whether the high side driver circuit is ON/OFF; and 2) a fault feedback signal from the voltage monitoring circuit 306. Based on this combination, the processing circuitry 218 may determine whether certain faults have occurred. If the processing circuitry 218 determines that a fault occurred, the processing circuitry 218 may transmit, using the one or more data channels 222, a single ON/OFF control signal to reset the protection latch in the high-side switch control circuitry 312.

Figure 4:
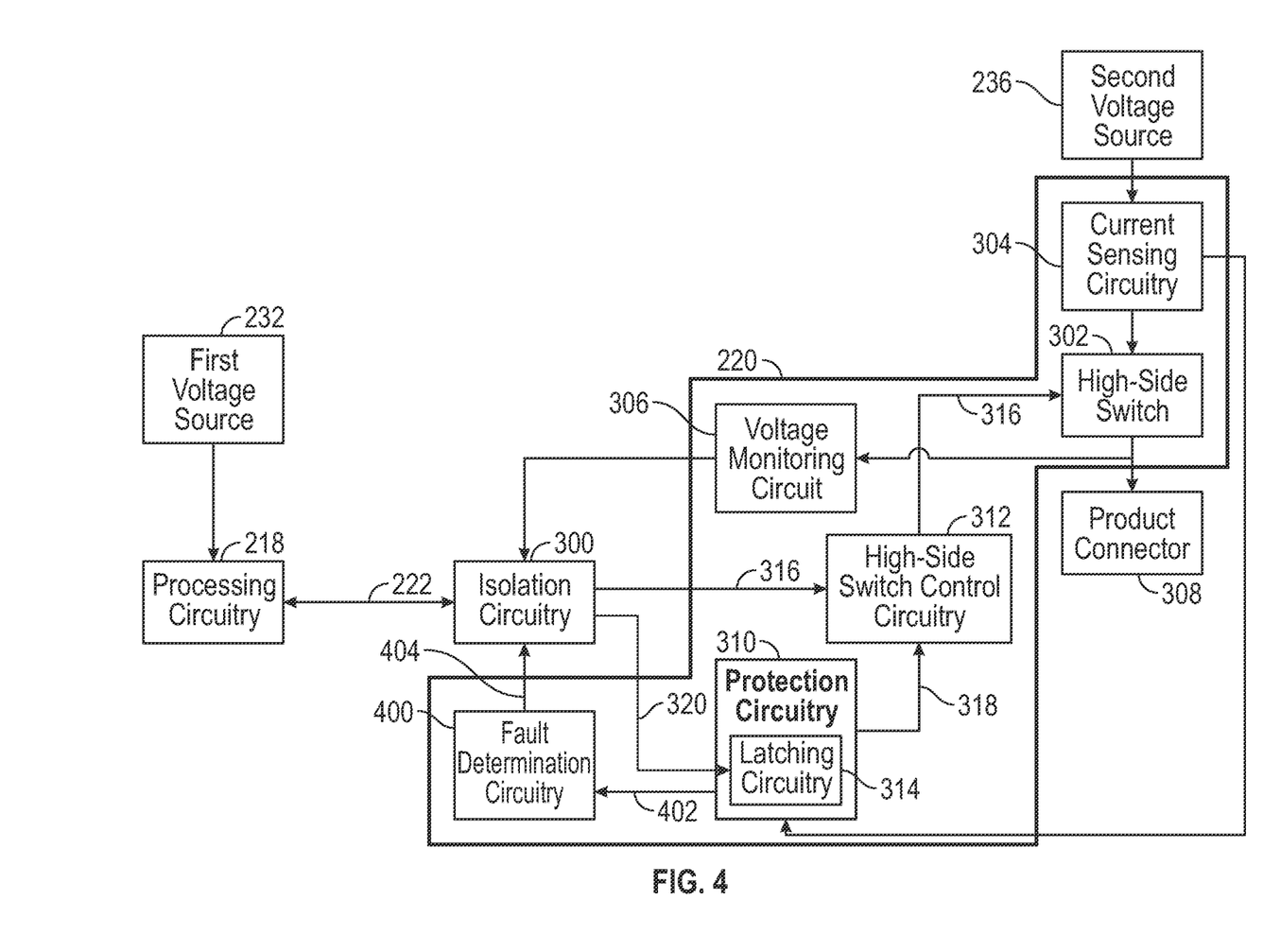
FIG. 4 is a block diagram of another example of the driver circuitry of FIG. 2 that may implement various techniques of this disclosure.

FIG. 4 is a block diagram of another example of the driver circuitry 220 of FIG. 2 that may implement various techniques of this disclosure. Many of the components in FIG. 4 are similar to those shown and described above with respect to FIG. 3 and, for purposes of conciseness, will not be described in detail again. In FIG. 4, the driver circuitry 220 includes fault determination circuitry 400. When a fault occurs, the protection circuitry 310 outputs a signal 402 to the fault determination circuitry 400, which determines the fault type, e.g., overcurrent fault and an undercurrent fault. The fault determination circuitry 400 then generates a fault feedback signal 404 representing the fault type to the processing circuitry 218 through the isolation circuitry 300. In this manner, the fault determination circuitry 400 provides an independent fault feedback signal to the processing circuitry 218 from the driver circuitry 220. This is in contrast with the techniques of FIG. 3 where voltage comparison information is provided by the voltage monitoring circuit 306 to the processing circuitry 218, which knows whether it commanded the driver circuitry 220 on/off, for diagnosing the different fault types.

Figure 5:
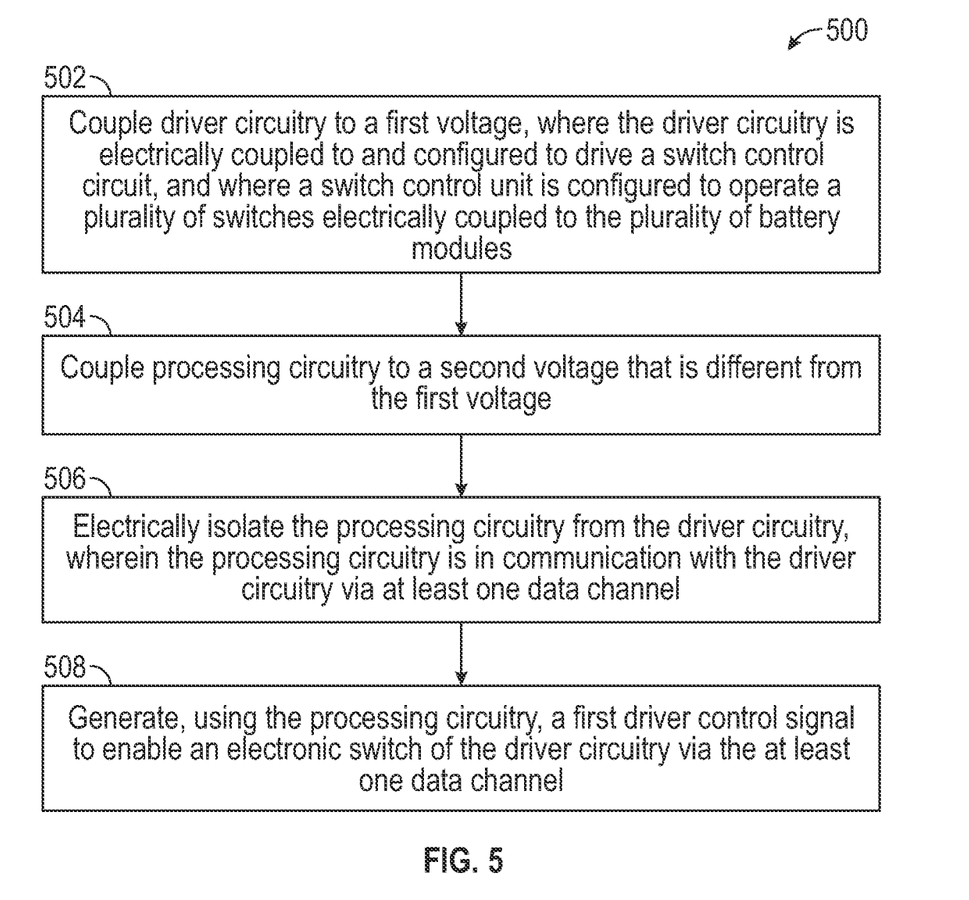
FIG. 5 is a flow diagram of an example of a method of operating a battery management system having a plurality of battery modules using various techniques of this disclosure.

FIG. 5 is a flow diagram of an example of a method 500 of operating a battery management system having a plurality of battery modules using various techniques of this disclosure. Corresponding ones of the plurality of battery modules include a battery cell and a cell monitoring circuit.

At block 502, the method 500 includes coupling driver circuitry to a first voltage, wherein the driver circuitry is electrically coupled to and configured to drive a switch control circuit, and wherein a switch control unit is configured to operate a plurality of switches electrically coupled to the plurality of battery modules.

At block 504, the method 500 includes coupling processing circuitry to a second voltage that is different from the first voltage.

At block 506, the method 500 includes electrically isolating the processing circuitry from the driver circuitry, wherein the processing circuitry is in communication with the driver circuitry via at least one data channel.

At block 508, the method 500 includes generating, using the processing circuitry, a first driver control signal to enable an electronic switch of the driver circuitry via the at least one data channel.

The method 500 may optionally include monitoring a voltage at an output of the driver circuitry and communicating the voltage to the processing circuitry via the at least one data channel.

The method 500 may optionally include outputting a first driver control signal to enable an electronic switch of the driver circuitry.

The method 500 may optionally include sensing a representation of a current through the electronic switch.

The method 500 may optionally include receiving the representation of the current through the electronic switch and disabling the electronic switch when a level of the current exceeds a threshold.

The method 500 may optionally include disabling the electronic switch when the level of the current exceeds a first threshold or disabling the electronic switch when the level of the current exceeds a second threshold for a duration of time, wherein the first threshold is higher than the second threshold.

The method 500 may optionally include latching the electronic switch in an OFF state when the level of the current exceeds the threshold.

The method 500 may optionally include outputting a second driver control signal to disable the electronic switch of the driver circuitry and to reset latching circuitry.

INDUSTRIAL APPLICABILITY

Electrified machines are powered by batteries instead of an engine. A battery pack may include one or more battery modules, and a battery module may include one or more battery cells. Battery modules may include a battery cell monitoring circuit to monitor, among other things, a voltage and a temperature of the battery cells in the battery module.

A battery pack controller may be in communication with the various battery module monitoring circuits to receive and aggregate the information from the various battery modules. The battery pack controller may coordinate operation of all the battery modules. The battery modules may be connected, such as in series and in parallel, with one another using high voltage, high current electrically controlled contacts of a contactor.

Some battery management approaches drive, or control, these contactors using pilot/interposed relays, which are external to bath the contactor and the battery pack controller or with low-side, sinking driver circuits within the battery pack controller. The present inventors have recognized that these approaches may have various drawbacks, such as increased component count, increased cost, and/or low reliability. In addition, these approaches may also cause incompatibility with the operation of some contactor devices. The present inventors have recognized a need for a solution that drives/controls the contactors using a high-side driver, not a low-side driver, that is integrated into the battery pack controller and that does not require external pilot/interpose relays.

This disclosure describes a driving circuit to control/drive a contactor using a high-side driver integrated into the battery pack controller. The driver circuit may electrically isolate the controller pins of the battery pack controller Which interface the contactors) from the low-voltage digital processing core of the battery pack controller. The driver circuit may provide techniques to diagnose a fault by monitoring the voltage at the output of the driver as compared to the reference voltage. The driver circuit may include an electronic switch, such as a field-effect transistor, that is configured on the high side of the contactor to control voltage from an energy source to the contactor.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, and B; A, B and B), unless otherwise indicated herein or clearly contradicted by context. Similarly, as used herein, the word "or" refers to any possible permutation of a set of items. For example, the phrase "A, B. or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A battery management system configured to couple to a plurality of battery modules, wherein corresponding ones of the plurality of battery modules include a battery cell and a cell monitoring circuit, the battery management system comprising:
- a plurality of electrically controlled switches electrically coupled to the plurality of battery modules;
- a switch control circuit configured to operate the plurality of electrically controlled switches;
- driver circuitry electrically coupled to the switch control circuit and configured to drive the switch control circuit, the driver circuitry electrically coupled to a first voltage source; and
- processing circuitry electrically coupled to a second voltage source that is different from the first voltage source, wherein the processing circuitry is configured to receive battery information from corresponding cell monitoring circuits of the plurality of battery modules, wherein the processing circuitry is electrically isolated from the driver circuitry, and wherein the processing circuitry is in communication with the driver circuitry via at least one data channel.

2. The battery management system of claim 1, further comprising:
- a voltage monitoring circuit configured to monitor a voltage at an output of the driver circuitry and communicate a representation of the voltage to the processing circuitry via the at least one data channel.

3. The battery management system of claim 1, wherein the processing circuitry is configured to enable the driver circuitry via the at least one data channel.

4. The battery management system of claim 3, wherein the processing circuitry configured to enable the driver circuitry via the at least one data channel is configured to:
- output a first driver control signal to enable an electronic switch of the driver circuitry.

5. The battery management system of claim 4, further comprising:
- current sensing circuitry to sense a representation of a current through the electronic switch.

6. The battery management system of claim 5, further comprising:
- protection circuitry configured to receive the representation of the current through the electronic switch and disable the electronic switch when a level of the current exceeds a threshold.

7. The battery management system of claim 6, wherein the protection circuitry configured to disable the electronic switch when a level of the current exceeds a threshold is configured to:
- disable the electronic switch when the level of the current exceeds a first threshold or disable the electronic switch when the level of the current exceeds a second threshold for a duration of time, wherein the first threshold is higher than the second threshold.

8. The battery management system of claim 6, further comprising:
- latching circuitry to latch the electronic switch in an OFF state when the level of the current exceeds the threshold.

9. The battery management system of claim 8, wherein the processing circuitry is configured to:
- output a second driver control signal to disable the electronic switch of the driver circuitry and to reset the latching circuitry.

10. The battery management system of claim 1, further comprising:
- fault determination circuitry configured to generate a fault feedback signal representing a fault type.

11. A method of operating a battery management system having a plurality of battery modules, wherein corresponding ones of the plurality of battery modules include a battery cell and a cell monitoring circuit, the method comprising:
- coupling driver circuitry to a first voltage, wherein the driver circuitry is electrically coupled to and configured to drive a switch control circuit, and Wherein a switch control unit is configured to operate a plurality of switches electrically coupled to the plurality of battery modules;
- coupling processing circuitry to a second voltage that is different from the first voltage;
- electrically isolating the processing circuitry from the driver circuitry, wherein the processing circuitry is in communication with the driver circuitry via at least one data channel; and
- generating, using the processing circuitry, a first driver control signal to enable an electronic switch of the driver circuitry via the at least one data channel.

12. The method of claim 11, further comprising:
- monitoring a voltage at an output of the driver circuitry and communicating the voltage to the processing circuitry via the at least one data channel.

13. The method of claim 12, further comprising:
- outputting a first driver control signal to enable an electronic switch of the driver circuitry.

14. The method of claim 13, further comprising:
- sensing a representation of a current through the electronic switch.

15. The method of claim 14, further comprising:
- receiving the representation of the current through the electronic switch and disabling the electronic switch when a level of the current exceeds a threshold.

16. The method of claim 15, further comprising:
- disabling the electronic switch when the level of the current exceeds a first threshold or disabling the electronic switch when the level of the current exceeds a second threshold for a duration of time, wherein the first threshold is higher than the second threshold.

17. The method of claim 15, further comprising:
- latching the electronic switch in an OFF state when the level of the current exceeds the threshold.

18. The method of claim 17, further comprising:
- outputting a second driver control signal to disable the electronic switch of the driver circuitry and to reset latching circuitry.

19. An electrified machine comprising:
- a machine frame; and
- a battery management system supported by the machine frame and configured to couple to a plurality of battery modules, wherein corresponding ones of the plurality of battery modules include a battery cell and a cell monitoring circuit, the battery management system comprising:
  - a plurality of electrically controlled switches electrically coupled to the plurality of battery modules;
  - a switch control circuit configured to operate the plurality of electrically controlled switches;
  - driver circuitry electrically coupled to the switch control circuit and configured to drive the switch control circuit, the driver circuitry electrically coupled to a first voltage source; and
  - processing circuitry electrically coupled to a second voltage source that is different from the first voltage source, wherein the processing circuitry is configured to receive battery information from corresponding cell monitoring circuits of the plurality of battery modules, wherein the processing circuitry is electrically isolated from the driver circuitry, and wherein the processing circuitry is in communication with the driver circuitry via at least one data channel.

20. The electrified machine of claim 19, wherein the battery management, further comprises:
   a voltage monitoring circuit configured to monitor a voltage at an output of the driver circuitry and communicate a representation of the voltage to the processing circuitry via the at least one data channel.

* * * * *